Patented Mar. 21, 1944

2,344,911

UNITED STATES PATENT OFFICE 2,344,911

TITANIUM CATALYST

David W. Young, Roselle, N. J., assignor to Standard Oil Development Company, a corporation of Delaware No Drawing. Application March 28, 1942, Serial No. 436,611

6 Claims. (Cl. 196—52)

The present invention relates to the preparation of catalysts and to the catalysts themselves and, more particularly, it relates to improved oil cracking catalysts and methods for preparing the same.

When cracking oils in the presence of a catalyst described hereinafter, the oil is initially vaporized and the oil vapors then subjected to cracking in the presence of the catalyst while at active cracking temperature for a period sufficient to obtain the desired conversion thereof.

Prior to my invention, it was known to prepare activated silica gel catalysts by forming a film of a titanium compound on said silica gel by treatment with an acid solution of a titanium salt. These catalysts contained a relatively small amount of titanium.

According to my invention, I prepare an alkaline solution of titanium dioxide and I impregnate silica gel catalyst with this solution and cause precipitation of the titanium dioxide on the silica gel solution by a heat treatment, pH change, or by electrolysis.

One of the primary objects of my invention therefore is to prepare active catalysts particularly suitable in the catalytic cracking of hydrocarbon oils, such as gas oil, to yield high quality motor and aviation fuel by impregnating silica gel with an alkaline solution of titanium dioxide and thereafter causing precipitation of the titanium dioxide within the gel structure.

A more specific object of my invention relates to the preparation of a synthetic cracking catalyst consisting essentially of silica gel activated with a relatively small amount of titanium oxide which comprises treating the silica gel in the hydrogel stage with an alkaline solution of titanium oxide and thereafter causing precipitation of the titanium oxide within the hydrogel, which hydrogel is then broken up, washed, dried and activated to form an active oil cracking catalyst.

Other and further objects of my invention will appear from the following more detailed description and claims.

In order to afford a better understanding of my invention, the following more specific example is set forth with the understanding that the precise details enumerated therein are purely illustrative and do not impose any limitation on the said invention.

Example 1

I first prepare a titanium sulfate solution of water, (the compound having the general formula $TiOSO_4$) containing 201 grams of $TiO_2$ per liter, and this, is slowly added to a saturated water solution of potassium bicarbonate. One part by volume of the clear titanium sulfate solution is added to 2.33 parts of potassium bicarbonate solution. The resulting clear mixture has a concentration of 60 grams of $TiO_2$ per liter and has a pH of 7.6 to 8.3 at room temperature. Improved stability of the alkaline titanium solution is obtained if crystals of $KHCO_3$ are present in the saturated solution at the start of the run.

Simultaneously, I prepare a silica gel in known manner, or by adding an acid such as a sulfuric acid to a sodium silicate solution. I prefer to use sodium silicate solutions containing 20% of $Na_2(SiO_3)_x$. The acid employed in making the gel may contain from 5–7% sulfuric acid and it is slowly added to the sodium silicate solution while stirring in order to form a sol. The sol is permitted to stand for several hours, say from 10–12 hours, whereupon it undergoes syneresis to form a jelly-like mass referred to as a hydrogel. The hydrogel is then broken up and washed in water in order to remove sodium sulfate and other water soluble salts. The gel is then dried by carefully heating the same up to a temperature of about 240° F.

The next step in the preparation of the catalyst is to treat the washed hydrogel with the aforementioned alkaline solution of titanium oxide and the mixture of titanium oxide solution and hydrogel is heated for a period of about ½ hour at a temperature oof about 176° F. The titanium solution undergoes hydrolysis and about 98% of the titanium is precipitated from the solution and deposited in very fine particles upon and in the silica gel. The mixture is then cooled and filtered. The residue comprising the silica gel with the titanium oxide contained therein is washed with water at room temperature, dried by heating to temperatures up to about 240° F. and finally slowly heated to temperatures about 1470–1670° F. for about two or three hours, whereupon the finished catalyst is produced after the calcining operation.

Referring again to the alkaline titanium oxide solution, it is pointed out that this may be prepared from iron free titanium hydroxide and sulfuric acid to form a clear solution, 1 mol of sulfuric acid of 100% strength being employed for each mol of titanium hydroxide. The titanyl sulfate solution (about 4 liters) which has a concentration of from 25–100 grams per liter is then slowly added at room temperature to 20 liters of a saturated water solution of potassium bicarbonate. The concentration of potassium bicarbonate employed is about 200–300 grams per liter. During the mixing of the material, the solution is agitated.

Instead of using $KHCO_3$ in the preceding example, I may employ $NH_4HCO_3$, or $NaHCO_3$. Also I may use titanium nitrate, or $TiCl_3$ in place of the titanium sulfate, as the starting material.

Also, instead of causing precipitation of the titanium oxide on the gel carrier or support by hydrolysis effected by heating the alkaline solution of titanium oxide, I may subject the titanium oxide solution to electrolysis whereupon the titanium oxide is precipitated in situ on the gel. I prefer to employ a current of 1–2 amperes at about 6 volts.

Also, instead of employing silica gel as a carrier, I may also employ other known carriers such as mixed or plural gels of silica and alumina, or magnesia, or I may employ as a carrier magnesia gel or alumina gel. It is within the purview of my invention to treat dry gels with the above titanium compounds.

Many modifications of my invention will be apparent to those familiar with this art.

What I claim is:

1. The process of catalytically cracking relatively heavy hydrocarbon oils to form hydrocarbons boiling within the gasoline range which comprises vaporizing said heavy oils and subjecting the vapors at cracking temperatures to the influence of a catalyst consisting of a synthetic gel carrying titanium oxide, which catalyst is prepared by treating the said gel with a titanium compound in alkali metal acid carbonate solution, causing precipitation of titanium oxide, washing, drying and calcining the said treated gel.

2. The method set forth in claim 1 in which the alkaline titanium compound is used to treat the silica gel while the latter is in the hydrogel stage.

3. The method of cracking hydrocarbon oil which comprises contacting the said oil at cracking temperatures with a catalyst comprising a silica gel activated by titanium oxide precipitated in situ from an alkali metal acid carbonate solution of a titanium compound.

4. A method of preparing a catalyst containing titanium oxide as an active ingredient which comprises impregnating a carrier with an acid carbonate solution of an alkali metal containing a titanium salt and decomposing the salt into the titanium oxide.

5. A method of preparing a catalyst adapted for the conversion of hydrocarbon oils which comprises impregnating a solid absorptive carrier with potassium acid carbonate solution containing a titanium salt and thereafter converting the salt into the oxide.

6. A process of preparing a catalyst adapted for the conversion of hydrocarbon oils which comprises forming a silica hydrogel, impregnating the hydrogel with a potassium acid carbonate solution containing a titanium salt, converting the titanium salt into the oxide and thereafter drying and activating the catalyst.

DAVID W. YOUNG.